United States Patent [19]

Clougherty

[11] 3,937,619

[45] Feb. 10, 1976

[54] TERNARY BORIDE PRODUCT AND PROCESS

[75] Inventor: Edward V. Clougherty, West Roxbury, Mass.

[73] Assignee: Manlabs, Incorporated, Cambridge, Mass.

[22] Filed: Sept. 27, 1973

[21] Appl. No.: 401,291

[52] U.S. Cl. .................. 29/182.5; 75/202; 75/226; 264/125
[51] Int. Cl.² ...................... B22F 3/14; C22C 1/05
[58] Field of Search ............ 75/202, 226; 29/182.5; 106/55, 57, 73.3; 264/125

[56] References Cited
UNITED STATES PATENTS

| | | | |
|---|---|---|---|
| 2,776,468 | 1/1957 | Steinitz | 75/202 X |
| 2,799,912 | 7/1957 | Greger | 75/202 X |
| 3,147,543 | 9/1964 | Doerner et al | 75/202 X |
| 3,802,850 | 4/1975 | Clougherty | 75/202 X |

*Primary Examiner*—Benjamin R. Padgett
*Assistant Examiner*—R. E. Schafer
*Attorney, Agent, or Firm*—Frank A. Steinhilper; Alfred H. Rosen

[57] ABSTRACT

A hard, tough, strong ceramic body is formed by hot pressing a mixture of a powdered metal and a powdered metal diboride. The metal employed is zirconium, titanium or hafnium and the diboride is the diboride of a different member of the same group of zirconium, titanium or hafnium to form a ternary composition. During hot pressing at temperatures above about 2,000°F., a substantial proportion of acicular ternary monoboride is formed.

9 Claims, No Drawings

TERNARY BORIDE PRODUCT AND PROCESS

The invention described herein was made in the performance of work under NASA Contract No. NAS W-2088 and is subject to the provisions of Section 305 of the National Aeronautics and Space Act of 1958 72 Stat. 435; 42 U.S.C. 2457.

BACKGROUND OF THE INVENTION

There are a number of important needs and uses for improved strong, hard, tough materials capable of being fabricated under feasible conditions and withstanding extremely severe conditions of use. For a great many such purposes, there are existing materials which do a reasonably good or in some instances an extremely good job, but for some other purposes, there simply are not suitable materials available. For a number of purposes where inherent chemical resistance is an important requirement, there is a very definite need for improved materials having the combination of properties including extreme hardness and toughness as well as chemical stability at very high temperatures. For example, in die casting operations and other hot forming operations, particularly with certain metals and other materials which are cast or extruded at extremely high temperature, it has been virtually impossible to find satisfactory tooling materials. Some of the products handled in operations of this sort are extremely difficult to handle because of their high temperature fabrication conditions and because of the abrasive nature of the products themselves. For example, extrusion of stainless steel and titanium using steel tooling such as dies results in excessive wear of such components, use of ceramic materials such as hot pressed SiC and $Si_3N_4$ eliminates the wear problem, but such components fail by brittle fracture induced in part by a lack of toughness.

At the present time, products such as silicon carbide and silicon nitride and aluminum oxides are being used for a number of these purposes or are at least of interest for possible use. Such materials, however, have certain limitations and usually are deficient either in toughness or in hardness or in high temperature stability.

GENERAL NATURE OF THE INVENTION

According to the present invention, a new class of materials has been developed comprising a shaped product having a high proportion of a ternary boride. The new materials are prepared by hot pressing finely powdered zirconium diboride or a similar diboride such as titanium diboride, hafnium diboride or the like mixed with a finely powdered metal such as titanium metal, hafnium metal, zirconium metal or the like. The appropriate finely powdered materials are thoroughly mixed and hot pressed, with the result that there is formed a hot pressed ceramic product including a large proportion of a ternary boride generally corresponding to a mixture of a ternary monoboride optionally containing unreacted free metal and diboride. Very fine results have been achieved with the presently preferred titanium and zirconium boride as a hot pressed product. When prepared from titanium metal and zirconium diboride, the product is hot pressed from between about 10% and about 50% by weight titanium metal and the remainder essentially the zirconium diboride. The products such as the hot pressed mixture of zirconium diboride and titanium or another metal such as hafnium or the like have a very advantageous combination of the desired properties of hardness, abrasion resistance, strength, toughness, thermal stability and chemical inertness and in addition, are capable themselves of being processed or fabricated at temperatures which are relatively low for ceramic hot pressing. In fact, the desired properties in some instances are so favorable that it has been difficult to test and evaluate the properties. For example, using ordinary cutting tools and usual cutting methods, a standard shape for certain strength tests could not be made in the laboratory, and an outside shop was unwilling to work with certain of the materials because of the toughness and hardness of the materials.

According to another embodiment of the invention, the starting materials chosen have been mixtures of two powdered diborides, such as zirconium diboride and titanium diboride, with an added powdered metal such as titanium, the proportions being selected to produce moderate to large amounts of a stable ternary monoboride. Extremely hard, tough hot pressed articles have been produced, particularly from pressing aimed at the production of large relative proportions of the ternary monoborides.

SPECIFIC NATURE OF THE INVENTION

The present invention relates to a hot pressed product prepared from a diboride such as zirconium diboride, titanium diboride, hafnium diboride, or mixtures thereof and a metal such as titanium, zirconium, hafnium or mixtures thereof. The presently preferred process for producing the product is to mix together thoroughly the two classes of starting materials, diboride and metal, and hot press them in the desired shape. During hot pressing, a chemical reaction takes place and it is presently believed that the final product is a mixture including some diboride, some metal and as a reaction product, a ternary boride.

The greatest amount of experience to date in the fabrication of products according to this invention has been obtained with hot pressed products formed from titanium metal and zirconium diboride mixtures, although useful products can be prepared with other mixtures. Accordingly, the invention will be particularly described with primary reference to the mixture of titanium metal and zirconium diboride.

It has previously been known that monoborides exist. Titanium monoboride and hafnium monoboride are both known at least in theory. Titanium mononboride is known to exist in the form of small crystals or grains in metallic (Ti) matrices and it has been known that titanium monoboride can be prepared by heating a mixture of titanium metal and titanium diboride. The present invention is a hot pressed product formed in the desired shape and containing substantial quantities of a ternary monoboride which in the presently preferred embodiment of the invention is a mixed monoboride of titanium and zirconium together with some unreacted product. Representative compositions have been employed including 12.5, 20 and 30 weight percent powdered titanium metal mixed with respectively 87.5, 80 and 70 weight percent powdered zirconium diboride. While it is not believed that the hot pressed product prepared according to this invention has undergone complete chemical reaction and accordingly, it is not believed that pure ternary monoboride is produced in the absence of free metal and unreacted diboride, it has, nevertheless, been found that certain of the desired product properties appear to be at a very high level in the composition prepared from approximately 30 weight percent of titanium and approximately 70 weight percent zirconium diboride. In addition, it has been found that fabricating and processing are relatively easy. Specifically, the product hot pressed from 30 weight percent titanium metal and 70 weight percent zirconium diboride can be hot pressed at a temperature of about 2400°F., whereas zirconium diboride alone requires a hot pressing temperature about 1,000°F. higher.

The composition of the hot pressed article prepared according to the present invention can be expressed in terms of certain proportions of two different metals, M1 and M2, and boron. The actual crystallographic nature of the product is now believed to be a mixture of the two metals, probably as an alloy, a ternary diboride and a ternary monoboride. Favorable experimental results have been achieved with compositions generally corresponding to a mixed ternary boride according to the formula $(M1, M2)_xB_2$, where x is between about 1.25 and about 2.5, preferably between about 1.5 and 2.2. The best results to date have been realized with a composition corresponding roughly with that of a monoboride, or in other words with x at a value of about 2.

It is observed that the composition of Example I where 12.5 weight percent titanium metal was incorporated in the starting mixture corresponds to the proportions represented by about $(Ti, Zr)_{1.25}B_2$. Similarly, the composition of this same example where 30 weight percent titanium metal is incorporated in the starting mix corresponds to approximately $(Ti, Zr)_2B_2$ which is essentially the composition of the mixed ternary monoboride. When hafnium, which has a distinctly greater atomic weight and density, is used in partial or complete substitution for the titanium or the zirconium, generally similar results are realized if the proportion of the hafnium is considered in terms of its atomic proportion according to this same formula. Accordingly, the invention can be considered as a ternary hot pressed mixture of a first metal, M1 which is one of the three metals, titanium, zirconium or hafnium and a second metal, M2, which is a different metal or mixture of metals from the same group of titanium, zirconium and hafnium where the composition is expressed by the formula $(M1, M2)_xB_2$ with x having the above indicated range from about 1.25 to about 2.5 and preferably from about 1.5 to about 2.2. In any of the cases, a significant proportion of the two metals and the boron are present in the form of acicular mixed monoboride and the presence of the monoboride can be recognized in microscopic studies. If desired, all three of the metals titanium, zirconium, and hafnium may be included in the composition and may be represented by at least a significant amount of $(Ti, Zr, Hf)B$.

EXAMPLE I

Several shaped articles were formed by hot pressing mixtures of zirconium diboride and titanium metal. The zirconium diboride was a finely powdered product having a particle size of less than 325 mesh. The titanium metal similarly was a finely divided powder having a particle size of less than 100 mesh. Mixtures of the two powders containing 12.5, 20 and 30 weight percent titanium metal were prepared. The powders were thoroughly mixed; it was found that mixing in a ball mill with steel balls provided essentially complete uniformity.

The mixed powders were loaded into a graphite hot pressing die lined with a graphite liner. In order to obtain two test samples prepared according to identical procedures, two samples were made and were separated in the die with a graphite spacer. A flowing argon atmosphere was maintained in the hot pressing apparatus during the fabrication cycle. The temperature was gradually increased to the desired maximum processing temperature, which in the case of the present example was 2550°F. The load on the compact was also gradually increased to the desired pressing temperature, which in this case was 3,000 pounds per square inch. The pressure was maintained at 3,000 pounds per square inch after the temperature had been raised to 2075°F. After pressing for about 2 ½ hours, the heating was discontinued and the product allowed to cool slowly until the pressure had fallen to 2000°F. Thereupon, the pressure was removed and the entire apparatus was allowed to cool over night. Upon removal from the die, the hot pressed samples were subjected to metallographic examination which revealed a duplex structure consisting of a first extremely fine grained acicular phase believed to be a ternary monoboride of titanium and zirconium and a second polycrystalline ceramic phase believed to be essentially zirconium diboride.

The procedure was repeated with different percentages of titanium metal. In the first hot pressing, there was employed 12.5% titanium metal and 87.5% zirconium diboride. In a second hot pressing, there was employed 20% titanium and 80% zirconium diboride. In a third hot pressing, there was employed 30% titanium and 70% zirconium diboride.

EXAMPLE II

The procedure of Example I was repeated with a mixture of titanium powder (−100 mesh), titanium diboride powder (−325 mesh) and zirconium diboride powder (−325 mesh). In one hot pressing, there was used 45 weight percent titanium, 22 weight percent zirconium diboride and 33 weight percent titanium diboride. In this hot pressing, a maximum temperature was 2550°F. and the pressure of 3,000 pounds per square inch was reached at 2090°F. and was held constant thereafter. Heating was discontinued after 190 minutes from the start of the heating cycle. When the temperature had fallen to 2,000°F., the pressure was removed. After cooling over night, the samples were removed from the die. Metallographic examination revealed an extremely fine grain acicular phase as the principal microstructural feature. This phase is believed to be primarily a ternary monoboride of titanium and zirconium.

Samples of the products prepared according to Examples I and II were prepared for various test procedures. Difficulty was experienced in the preparation of test samples of the product of Example II in that the hot pressed products were extremely hard and resisted cutting. A diamond cutting tool exhibited significant wear without successfully cutting the sample into test sizes and shapes.

Measured room temperature strengths for composites initially containing 20 and 30 weight percent titanium and zirconium diboride were 97,800 psi and 150,000 psi, respectively. The measured strengths increased with increasing amount of the fine-grained acicular phase. Fracture toughness also increased with the increase in the acicular phase; the measured work of fracture (W/2A) for the product pressed from 30% titanium and 70% zirconium diboride is 138 × 10³ ergs/cm².

EXAMPLE III

The procedure of Example I was repeated using 12.5%, 20%, 25% and 30% respectively of titanium metal in a series of mixtures with zirconium diboride, and the strengths measured:

| % Ti Metal | Strength - Pounds per square inch |
|---|---|
| 12.5 | 77,000 |
| 20 | 93,000 |
| 25 | 113,000 |
| 30 | 150,000 |

The product of Example II was not subjected to this test because the sample could not be cut to the required size and shape.

The strength and toughness of the hot pressed product prepared from 30% titanium and 70% zirconium diboride according to Example I has been compared against the strength and toughness of prior art products. Highly regarded prior art products are aluminum-oxide, silicon carbide and silicon nitride. The product prepared according to Example I has been found to be greatly superior to typical prior art products in both strength and toughness. Shown in Table I is the comparison with reported data according to four prior references as follows. The first reference is L. A. Simpson, "Effects of Microstructure on Measurements of Fracture Energy of $Al_2O_3$", J. Am. Cer. Soc. 56 7 (1973). The second reference is J. A. Coppola and R. C. Brandt, J. Am. Cer. Soc. 55 455 (1972). The third reference is a private communication to the inventor relative to a silicon carbide product. The fourth reference is a contractors report to a government contracting agency with regard to a silicon nitride product. The data selected from each reference are believed to be favorable data selected by the authors relating to performance of their products. Generally, in current technology, silicon carbide has a strength (sigma) of roughly up to 100,000 pounds per square inch and toughness (gamma) around 30 × 10³ ergs per square centimeter. For silicon nitride strength is about the same as for silicon carbide, and toughness is about 70 × 10³ ergs per square centimeter. The products of the present invention have strength up to 150,000 pounds per square inch and toughness as high as 140 × 10³ ergs per square centimeter. Of particular note is the fact that both strength and toughness are increased.

Strength and Toughness (Work Controlled Fracture) of Prior Ceramic Materials and $ZrB_2$/Ti Composites

| Material | Reference | Strength (psi) | Toughness (ergs/cm²) |
|---|---|---|---|
| Aluminum Oxides (sintered) | 1 | 29,000 | 40 × 10³ |
| Silicon Carbide (reaction sintered) | 2 | 17,800 | 27 × 10³ |
| Silicon Carbide (hot pressed) | 2 | 24,300 | 83 × 10³ |
| Silicon Carbide (hot pressed) | 3 | 80,000 | 30 × 10³ |
| Silicon Nitride (hot pressed) | 4 | 94,000 | 70 × 10³ |
| $ZrB_2$30Ti (hot pressed) Example I | — | 150,000 | 138 × 10³ |
| hot pressed: Example II | — | Test sample not cut | |

It is particularly important in this art to have extremely good quality control; special attention should be directed to particle size control to produce uniform fine grain polycrystalline material. It apparently is the weakness associated with the larger grain which is the limiting factor regarding strength or toughness, whichever property is being viewed. Generally speaking, a product in which all of the grains are no larger than 10 microns is stronger and tougher than a product in which most of the grains are approximately 5 microns and a few of the grains up around 20 to 40 microns. Thus, it is important that in the present invention, the results which are being approached are uniformity of grains of a size range of no more than 5 microns. When the product of Example II is viewed at 1500X magnification, the particles appear very small and it seems that the effective particle size is around one micron even though the particle size of the starting materials was greatly larger than one micron. An important advantage of the invention apparently resulting at least in part from the relatively low processing temperature is the avoidance of exaggerated grain growth and resultant attainment of high strength and toughness.

Hafnium boron compositions of the type produced in this invention are generally strongly oxidation resistant, and accordingly, hafnium is particularly useful in the invention to produce improved oxidation resistance. One of the items of interest here is the cost of hafnium borides. Hafnium borides containing moderate quantities of zirconium are not excessively expensive so that hafnium-zirconium monoboride or hafnium-zirconium-titanium monoboride products are both valuable in their properties and realistic in their cost.

I claim:

1. A tough, hard, hot pressed shaped body containing boron and at least two of the three elements, titanium, zirconium, hafnium, hot pressed from a mixture of powdered metal and a powdered diboride to form substantial quantities of a ternary monoboride of said elements and having a percentage composition corresponding to the formula $(M1, M2)_x B_2$ where M1 is titanium, zirconium or hafnium and M2 is a different metal of the group of titanium, zirconium and hafnium, and where x is between about 1.25 and about 2.5.

2. The hot pressed product of claim 1, where x is between about 1.5 and about 2.2.

3. The hot pressed product of claim 1, where x is about 2.

4. A tough, hard, hot pressed shaped body containing boron, titanium and zirconium hot pressed from a mixture of metal and diboride to form substantial quantities of titanium-zirconium monoboride and having a percentage composition corresponding to the formula $(Ti, Zr)_x B_2$ where x is is between about 1.25 and about 2.5.

5. The hot pressed product of claim 4, where x is between about 1.5 and about 2.2.

6. A tough, hard, hot pressed shaped body having a composition corresponding approximately to a ternary monoboride of titanium and zirconium and having approximately equal atomic proportions of titanium and zirconium.

7. A method of making a hard, tough, shaped body comprising hot pressing at a temperature at least about 2000°F. a uniform mixture of powdered metal and powdered metal diboride where the diboride is selected from the group consisting of titanium diboride, zirconium diboride, hafnium diboride and mixtures thereof and the powdered metal is a different metal selected from titanium, zirconium, hafnium and mixtures thereof, said method forming substantial quantities of a ternary monoboride from said powdered metal and said diboride.

8. A method according to claim 7 wherein the diboride is titanium diboride or zirconium diboride or a mixture thereof and wherein the metal powder is a different metal of the group of titanium and zirconium, whereby the mixture is a ternary mixture containing zirconium, titanium and boron, in approximately the proportions corresponding to a ternary monoboride.

9. A method of making a strong, tough, hard, shaped ceramic body comprising uniformly mixing zirconium diboride powder and about 10% to about 30% by weight of titanium metal powder and hot pressing said mixture at about 3,000 pounds per square inch at a temperature of at least about 2,500°F., to produce a ceramic body containing substantial quantities of acicular zirconium titanium monoboride.

* * * * *